United States Patent Office 3,178,232
Patented Apr. 13, 1965

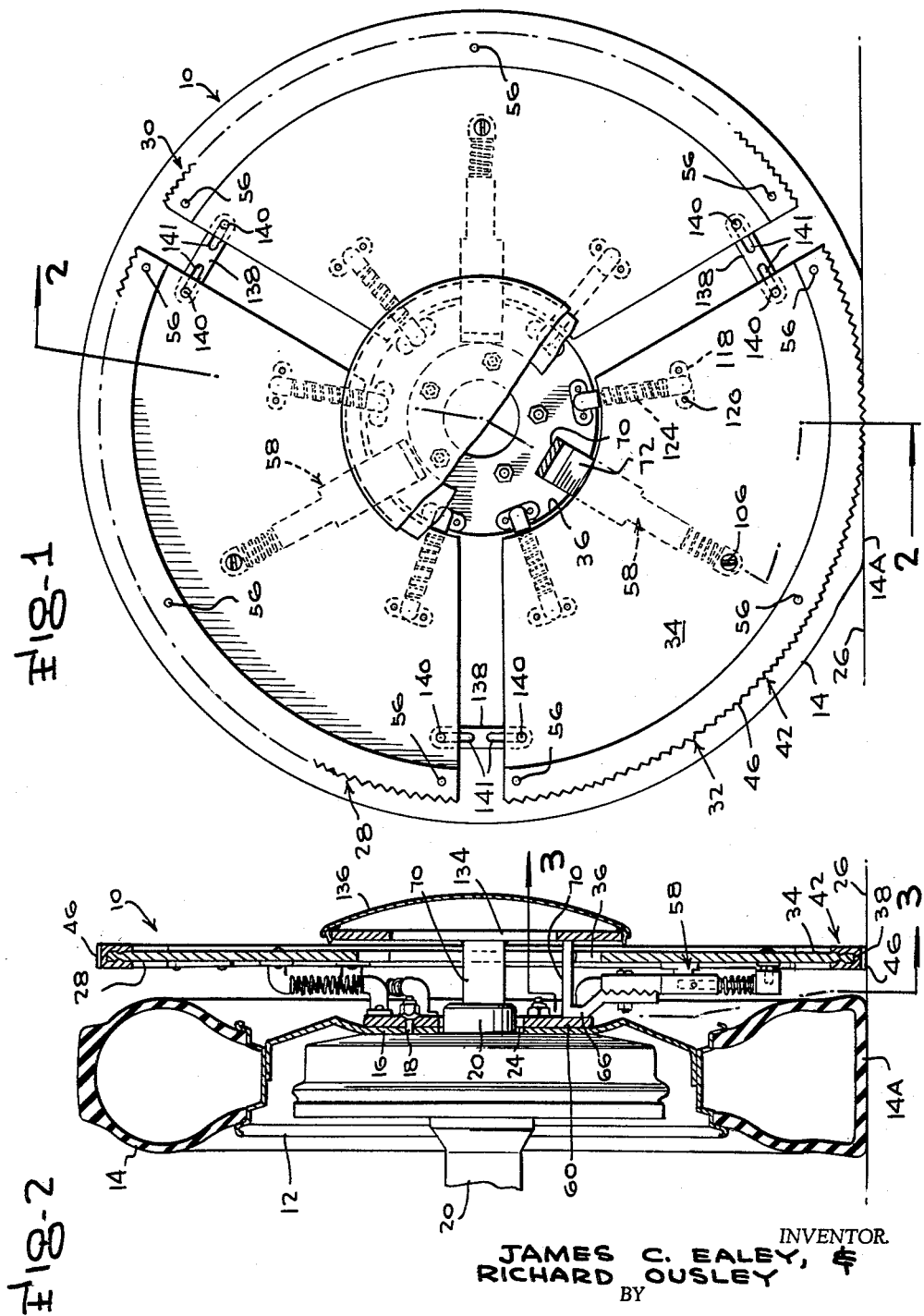

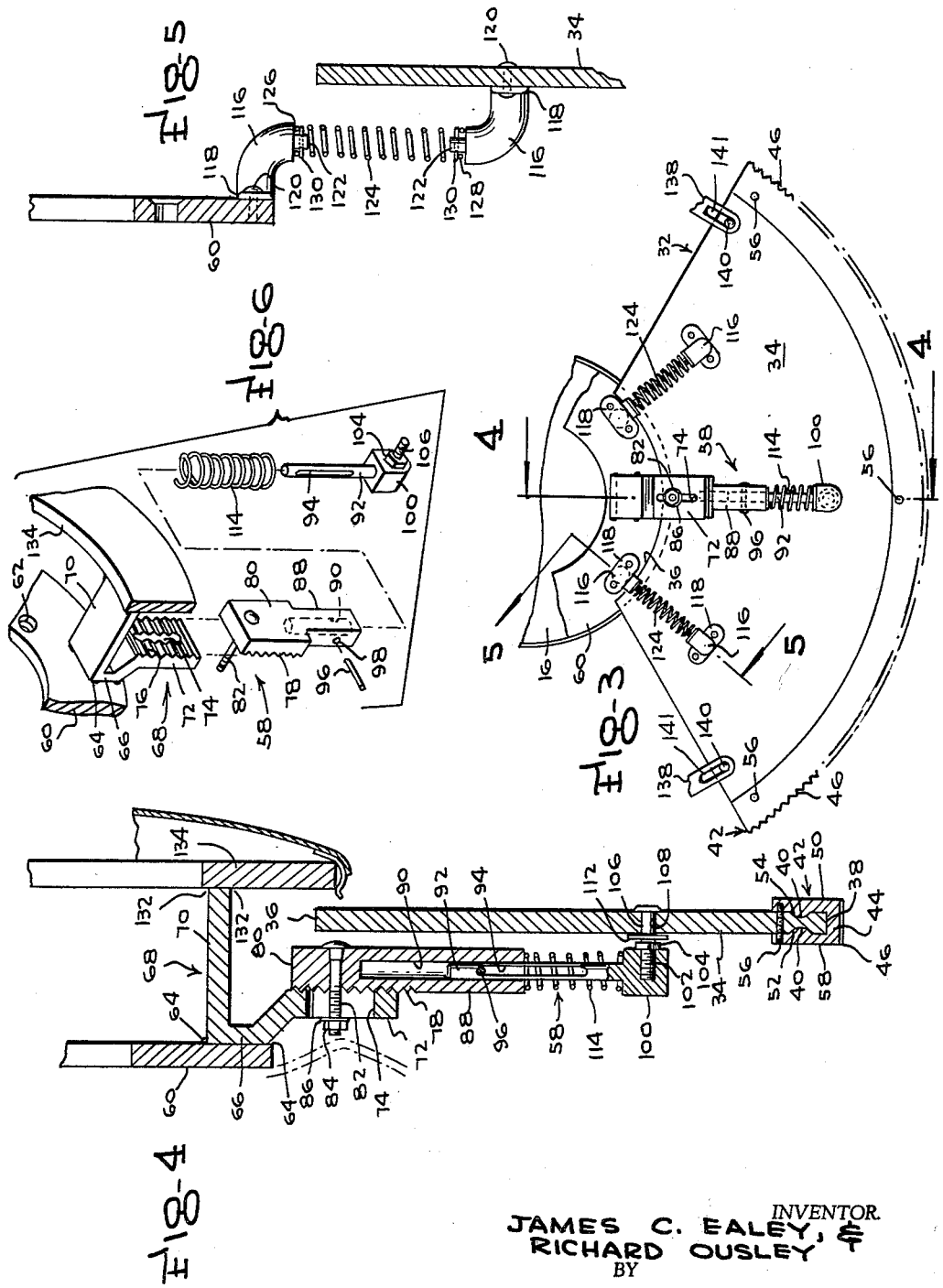

3,178,232
NON-SKID AND NON-SLIDE ATTACHMENT FOR VEHICLE WHEELS
James C. Ealey and Richard Ousley, Raceland, Ky., assignors of one-third to Charles B. Johnson, Russell, Ky.
Filed Apr. 26, 1963, Ser. No. 275,861
3 Claims. (Cl. 301—51)

This invention relates to the general field of safety devices and, more particularly, the instant invention pertains to the provision of non-skid and non-slide attachments for vehicle wheels.

One of the primary objects of this invention is to provide positive actuated means as an attachment to the wheel of a vehicle, the means serving to prevent the vehicle from sliding in a linear direction and to prevent skidding thereof in directions lateral to the normal path of movement of the vehicle.

A further object of this invention is to provide an attachment for vehicle wheels of such type as to prevent the slipping and skidding of the wheels on ice or other slippery surfaces.

A further object of this invention is to provide an attachment for an automobile wheel which becomes operable by deflation of the tire on the wheel to afford positive traction over surfaces which may be slippery due to rain or ice, mud, or snow, the attachment being readily rendered inoperative through inflation of the tire when the vehicle is operated over roads which are in prime condition.

Still another object of this invention is to provide positive traction means for the wheels of automotive vehicles, the traction means being normally out of engagement with a road surface, but engageable therewith as the vehicle may lean while going around curves, or cants to prevent skidding or sliding.

This invention contemplates, as a further object thereof, the provision of means of the type generally referred to above, the means being non-complex in construction and assembly, inexpensive to manufacture, and maintain, and which are durable in use.

Other and further objects and advantages of the instant invention will become more evident from a consideration of the following specification when read in conjunction with the annexed drawings, in which:

FIGURE 1 is a side elevational view of an automobile wheel including the positive traction attachment constructed in accordance with this invention;

FIGURE 2 is a detail, cross-sectional view, FIGURE 2 being taken substantially on line 2—2 of FIGURE 1, looking in the direction of the arrows;

FIGURE 3 is a fragmentary detail, cross-sectional view, FIGURE 3 being taken substantially on the line 3—3 of FIGURE 2, looking in the direction of the arrows;

FIGURE 4 is an enlarged detail, cross-sectional view, FIGURE 4 being taken substantially on the vertical plane of line 4—4 of FIGURE 3, looking in the direction of the arrows;

FIGURE 5 is an enlarged detail, fragmentary, cross-sectional view, FIGURE 5 being taken substantially on the inclined plane of line 5—5 of FIGURE 3, looking in the direction of the arrows; and FIGURE 6 is an enlarged exploded, perspective view illustrating certain adjustment features of the attachment.

Referring now more specifically to the drawings, reference numeral 10 designates, in general, an anti-skid, anti-slide device for an automobile (not shown) or for other wheeled land vehicles. In the several figures of the drawings, reference numeral 12 designates a conventional automobile wheel on which is detachably mounted the customary hollow tubular pneumatic tire 14. The wheel 12 includes a conventional substantially discoidal hub 16 that connects through bolts 18 with the wheel axle 20 in the usual manner. As is seen in FIGURE 2, the axle 20 includes a stub axle 22 that projects laterally through a centrally-located cylindrical opening 24 formed in the hub 16. The tire 14 has been shown in FIGURES 1 and 2 as having been deflated to a poundage below the normal air pressure usually carried by the tire 14 under normal operating conditions so that a relatively flat traction portion 14A is provided, due to the weight of the vehicle and the weight of the passengers carried therein. This, understandably, affords a greater frictional contact with a ground surface 26 in order to prevent the sliding or skidding of the vehicle under inclement weather conditions.

The attachment 10 is seen to comprise three segment-shaped members 28, 30, 32. Since each of the segment members 28, 30 and 32 is identical in construction and assembly, a description of one is the description of each of the others.

Electing the segment 32 for detailed description, the segment 32 is seen to include a segmental substantially flat plate 34 having an arcuate cut-out 36 at the apex thereof which extends through substantially 120°. The outer arcuate end 38 of the plate 34 extends through an arc also of substantially 120° and adjacent its outer marginal edge the observe and reverse sides of the segmental plate are formed with arcuate recesses 40 which are coincident and parallel in laterally-spaced planes (see FIGURE 2).

Reference numeral 42 indicates, generally, an arcuate U-shaped traction member which includes a bight 44 from which project a plurality of outwardly-extending transversely-positioned road-engageable teeth 46. The traction member 42 also comprises a pair of parallel upstanding arcuate arms 48, 50 of which the confronting adjacent faces include laterally-spaced and parallel ribs 52, 54 disposed in registry with one another. The ribs 52, 54 are adapted to engage within the recesses 40 to releasably secure the traction member 42 on the segmental plate 34, and screws 56 are threaded through the side walls 48, 50 and the plate 34 to insure the connection therebetween.

Reference numeral 58 designates, generally, means for connecting the plate 34 with the hub 16 and to facilitate the assembly of the attachment 10. These means are shown in particular detail in FIGURES 4 and 6. The means 58 include an annular element 60 having circumferentially-spaced bolt holes 62 extending transversely therethrough. The element 60 is juxtaposed relative to the hub 16 and is held thereagainst by the bolts 18 which also pass through the holes 62. Welded to the element 60 as at 64 is a foot portion 66 of an L-shaped bracket 68 having a leg portion 70. The foot portion 66 includes a laterally and outwardly-offset rack section 72 having an elongated substantially rectangular configuration through which transversely extends an elongated slot 74 centrally thereof. The outer face of the offset section 72 is formed with a plurality of transversely-extending rack teeth 76 which are adapted to mesh, in adjusted relation, with the rack teeth 78 of a second substantially rectangular rack section 80, the latter being held in longitudinally-adjusted position relative to the rack section 72 by means of a bolt 82 which extends transversely through the rack section 80 and through the slot 74 to receive a fastening nut 84 and lock washer 86 thereon, the latter spanning the slot. The rack section 80 is integral, at one end thereof, with an elongated substantially rectangular stem 88. The stem 88, as well as an adjacent portion of the rack section 80 are provided with a longitudinally-extending centrally-located cylindrical bore 90 in which is mounted for reciprocation one end of an elongated substantially cylindrical shaft 92. The shaft 92 has an elongated axially-extending diametrical slot 94 through which extends a limit pin 96 that extends transversely across the stem 88 in a bore 98 (see FIGURE 6).

The lower end of the shaft 92 (as viewed in FIGURES 1, 3 and 6), terminates in an enlarged ogive base 100 in which is threaded one end of a screw 102 having a nut 104 that is threaded down to lock against the base 100. In the construction shown, the screw 102 projects laterally from the base 100 at right angles with respect to the pin 96 and has a projecting end portion 106 which extends transversely through a suitable bore 108 formed in the plate 34, at substantially mid-point or spaced inwardly 60° between the radially-spaced edges of the segmental plate 34. A spacer washer 112 is mounted on the projecting end portion between the nut 104 and the adjacent side of the plate 34.

As is seen in the drawings, a helicoidal spring 114 is interposed between the base 100 and the adjacent end of the stem 88, the spring 114 constantly biasing the base 100 for movement in a direction away from the stem 88. The relative adjustment of the rack section 80 determines, of course, the degree of compression on the spring 114.

Reference numerals 116 denote a plurality of pairs of identically constructed elbow connectors inverted and reversed with respect to one another and with each pair of connectors having aligned opposed ends. As is seen in the drawings, a pair of the elbow connectors 116 is disposed on each side of the adjustment means 58 and each pair of connectors is provided with bracket means 118 which are juxtaposed against the plate 34 and the annular element 60 and are secured thereto by rivets 120. The confronting ends of each pair of connectors each have cylindrical spring keeper pins 122 projecting therefrom. Extending between each pair of confronting ends of the connectors 116 is a helicoidal spring 124 under compression with the terminal convolutions 126, 128 thereof engaging thereagainst and surrounding the adjacent one of the keeper pins 122. Each of the keeper pins 122 carries a diametrically-extending hold-down pin 130 which engage and retain the terminal convolutions 126, 128.

Reference is now made to FIGURES 2, 4 and 6 where it is seen that the outer end of the leg portion 70 is welded, as at 132, to an annular cap member 134. The leg portion 70 spans the cut-out 36, and the cap member 134 has releasably secured thereto a conventional hub cap 136.

Adjacent pairs of the segmental plates 34 are connected together by links 138 and rivets 140 which are slidably received within elongated slots 141 at each end of the links 138.

The anti-skid, anti-slide device 10, is assembled on the wheel 12 in the manner described above with the tire 14 fully inflated, and becomes operable when driving on icy or slippery surfaces by reducing the air pressure of the tires 14 to give a greater traction or tread surface 14A, as shown in FIGURES 1 and 2, and to cause the lowermost ones of the segment plates 28, 30, 32 to engage the ground 26 as the wheels 12 rotate.

The segmental members 28, 30, 32 are constantly biased to their maximum outward positions relative to the axle 20, but will yield to permit the segmental members to move a slight distance radially and inwardly when one thereof makes ground contact or encounters an elevated obstruction in its path of movement.

It will be appreciated, of course, that the helicoidal springs 114, 124 constantly bias the segmental members 28, 30, 32 toward their maximum outward positions slightly inside the outer periphery of the tire 14 when normally inflated so that they achieve a ground-gripping engagement of the teeth 46 with the ground surface 26 even if the vehicle turns laterally in a path diverging from the usual linear path of movement thereof and cants in so turning. Thus, automatically-adjustable means are afforded to the user of this device under all directions of movement.

When desired, the entire attachment may be easily removed from the wheel to which it is attached through the simple expedient of removing the bolts 18.

Having described and illustrated one embodiment of this invention, in detail, it will be understood that the same is offered merely by way of example, and that this invention is to be limited only by the scope of the appended claims.

What is claimed is:

1. An anti-skid anti-slide attachment for a vehicle wheel mounted for rotation on an axle having a hub, an annular element, means releasably connecting said annular element with said hub, a plurality of segmental ground-engaging members, a plurality of first means resiliently connecting each of said segmental members with said annular element, an L-shaped bracket for each of said ground-engaging members, each of said L-shaped brackets being disposed between an adjacent pair of said first resilient means, each of said brackets having a portion thereof fixedly secured to said annular element and including a first rack section offset with respect to said annular element, said offset section having a plurality of rack teeth extending transversely thereacross and a longitudinally-extending slot formed therein, a substantially rectangular second rack section for each of said first rack sections, respectively, each of said second rack sections having a plurality of rack teeth extending transversely thereacross, means extending through said first and second rack sections and said slot to adjustably hold said teeth of said first and second rack sections in meshed relation relative to one another, means mounted on each of said second rack sections pivotally connecting, respectively, one of said segments therewith, second resilient means interposed between each of said second rack sections and said last-named means, means pivotally and slidably connecting adjacent sides of said adjacent segments, and ground-engaging teeth extending transversely across the outer periphery of each of said segments.

2. An anti-skid anti-slide attachment for a vehicle wheel mounted for rotation on an axle and having a hub, an annular element, means connecting said annular element with said hub, a plurality of segmental ground-engaging members, a plurality of first means resiliently connecting each of said segmental members with said annular element, an L-shaped bracket for each segment, said bracket having the foot portion thereof fixedly secured to said annular element between said first resilient means and having a rack section offset with respect to said annular element, said offset section having a plurality of rack teeth extending transversely thereacross and a longitudinally-extending slot formed therein and extending therethrough, a substantially rectangular second rack section having a plurality of rack teeth extending transversely thereacross, means extending through said first and second rack sections and said slot to adjustably hold said rack teeth of said first and second rack sections in meshed adjusted relation relative to each other, said second rack section having a stem projecting therefrom, said stem being mounted for reciprocation on each of said second rack sections, means projecting laterally from each of said stems to pivotally connect one of said ground-engaging segments, respectively, thereon, resilient means mounted on each of said stems between each of said second rack sections, and said last-named means, said last-named resilient means constantly tending to bias said segmental sections for movement radially and outwardly from said axle, said first and second rack sections being adjustable to control to the compression on said last-named resilient means, a link for each adjacent pair of segments, and means pivotally and slidably connecting the opposed ends of each of said links with, respectively, adjacent sides of said segmental sections adjacent the outer periphery thereof.

3. An anti-skid anti-slide attachment for a vehicle wheel mounted for rotation on an axle and having a hub, an annular element, means releasably connecting said annular element with said hub, a plurality of segmental ground-engaging members, first means resiliently connecting said segmental members with said annular element, an L-shaped bracket for each of said members, said brackets each having a portion thereof fixedly secured to said annular element and including a rack section thereof offset with respect to said annular element, said offset section having a plurality of rack teeth extending transversely thereacross and a longitudinally-extending slot formed therein and extending therethrough, a second rack section for each of said first rack sections, said second rack sections each having a plurality of rack teeth extending transversely thereacross, means extending through said first and second rack sections and said slot to adjustably hold said rack teeth of said first and second rack sections in meshed relation relative to each other, each of said second rack sections having a stem projecting from a side thereof in radial relation relative to said axle, each of said stems having a bore extending longitudinally therethrough, a substantially cylindrical shaft mounted for reciprocation in each of said bores, a block fixedly secured to the outer end of each of said shafts, resilient means interposed between each of said blocks and an adjacent one of said second rack sections, respectively, constantly tending to bias said segmental sections for radial movement away from said axle, means pivotally connecting, respectively, one of said segmental members to one of said blocks, and link means pivotally and slidably connecting each pair of adjacent sides of adjacent pairs of segments.

References Cited by the Examiner
UNITED STATES PATENTS

| 1,410,200 | 3/22 | Lunz | 301—47 |
| 2,108,346 | 2/38 | Paul | 301—50 X |
| 2,162,643 | 6/39 | Schiding | 301—47 |
| 2,177,042 | 10/39 | Michael | 301—38 |

FOREIGN PATENTS

| 474,347 | 6/51 | Canada. |
| 500,254 | 3/54 | Canada. |

ARTHUR L. LA POINT, *Primary Examiner.*